US012649323B2

(12) United States Patent
Maezawa

(10) Patent No.: US 12,649,323 B2
(45) Date of Patent: Jun. 9, 2026

(54) INKJET IMAGE FORMING APPARATUS

(71) Applicant: KYOCERA Document Solutions Inc., Osaka (JP)

(72) Inventor: Nobuhiro Maezawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 141 days.

(21) Appl. No.: 18/895,320

(22) Filed: Sep. 24, 2024

(65) Prior Publication Data

US 2025/0100297 A1 Mar. 27, 2025

(30) Foreign Application Priority Data

Sep. 25, 2023 (JP) ................................ 2023-159442

(51) Int. Cl.

| | |
|---|---|
| ***B41J 11/00*** | (2006.01) |
| ***B41J 2/14*** | (2006.01) |
| ***B41J 25/308*** | (2006.01) |
| *B41J 11/04* | (2006.01) |
| *B41J 11/057* | (2006.01) |

(52) U.S. Cl.

CPC ............ *B41J 11/0015* (2013.01); *B41J 2/14* (2013.01); *B41J 25/3086* (2013.01); *B41J 11/002* (2013.01); *B41J 11/0021* (2021.01); *B41J 11/00212* (2021.01); *B41J 11/00216* (2021.01); *B41J 11/0024* (2021.01); *B41J 11/04* (2013.01); *B41J 11/057* (2013.01)

(58) Field of Classification Search

CPC ...... B41J 11/0015; B41J 2/14; B41J 25/3086; B41J 11/002; B41J 11/0021; B41J 11/00212; B41J 11/00216; B41J 11/0024; B41J 11/04; B41J 11/057

See application file for complete search history.

(56) References Cited

U.S. PATENT DOCUMENTS

| | | | | |
|---|---|---|---|---|
| 2013/0250017 | A1* | 9/2013 | Saitoh | B41M 5/502 347/101 |
| 2022/0396083 | A1* | 12/2022 | Takeuchi | B41J 11/0015 |
| 2023/0037226 | A1* | 2/2023 | Hayasaka | B41J 2/2117 |

FOREIGN PATENT DOCUMENTS

| | | | | |
|---|---|---|---|---|
| JP | H06163143 A | | 6/1994 | |
| JP | 2004103289 A | | 4/2004 | |
| JP | 2012081608 A | * | 4/2012 | B41J 11/0015 |

* cited by examiner

*Primary Examiner* — Henok D Legesse
(74) *Attorney, Agent, or Firm* — Studebaker Brackett PLLC

(57) ABSTRACT

An inkjet image forming apparatus include a head unit and a corona treatment unit. The head unit ejects ink on a printing base material conveyed in a predetermined conveyance direction. The corona treatment unit is disposed on an upstream side of the head unit in the conveyance direction and performs a corona discharge on the printing base material. The corona treatment unit includes a counter roller facing a corona discharge electrode. The counter roller has an inverted crown shape in which a diameter of a central portion is smaller than diameters of both end portions in a width direction crossing the conveyance direction.

4 Claims, 6 Drawing Sheets

FIG. 6

| | COUNTER ROLLER | | WRINKLES | SOLID IMAGE DENSITY UNEVENNESS ΔID |
|---|---|---|---|---|
| | OUTER DIAMETER (mm) (CENTRAL PORTION) | OUTER DIAMETER (mm) (END PORTION) | | |
| PRESENT EXAMPLE 1 | 45 | 40 | ○ | 0.01 |
| PRESENT EXAMPLE 2 | 42 | 40 | ○ | 0.008 |
| PRESENT EXAMPLE 3 | 41 | 40 | ○ | 0.011 |
| COMPARATIVE EXAMPLE 1 | 40 | 40 | △ | 0.03 |
| COMPARATIVE EXAMPLE 2 | 39 | 40 | × | 0.038 |

INKJET IMAGE FORMING APPARATUS

INCORPORATION BY REFERENCE

This application is based on and claims the benefit of priority from Japanese patent application No. 2023-159442 filed on Sep. 25, 2023, which is incorporated by reference in its entirety.

BACKGROUND

The present disclosure relates to an inkjet image forming apparatus which forms an image on a printing base material by an inkjet method.

In the inkjet image forming apparatus, corona discharge is sometimes applied to the printing base material in order to improve adhesion between the printing base material and ink.

There is provided an electrode structure for corona treatment in which a discharge surface is formed into an arcuate curved surface around an axis of an earth roll. Thus, even if a conveying speed of the printing base material is increased, a discharge time can be ensured. There is also provided a corona treatment apparatus having an adjustment mechanism for adjusting a clearance between a corona discharge electrode treatment roll by bending of the electrode due to heat generated during the corona discharge.

However, in the former electrode structure for corona treatment, if the conveying speed is increased in the case of a printing base material having a thin thickness and no stiffness, wrinkles are likely to occur in the printing base material. If the corona treatment is performed while the wrinkles occur on the printing base material, the corona discharge treatment may be varied, and an image quality may deteriorate. Also, in the latter corona a treatment apparatus, it is not possible to obtain an effect of suppressing the occurrence of wrinkles when the conveying speed of the printing base material having a thin thickness and no stiffness is increased.

SUMMARY

An inkjet image forming apparatus according to the present disclosure include a head unit and a corona treatment unit. The head unit ejects ink on a printing base material conveyed in a predetermined conveyance direction. The corona treatment unit is disposed on an upstream side of the head unit in the conveyance direction and performs corona discharge on the printing base material. The corona treatment unit includes a counter roller facing a corona discharge electrode. The counter roller has an inverted crown shape in which a diameter of a central portion is smaller than diameters of both end portions in a width direction crossing the conveyance direction.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIG. 6 is a table showing a result of evaluating for wrinkles, in the inkjet recording apparatus according to the embodiment of the present disclosure.

DETAILED DESCRIPTION

Hereinafter, with reference to the attached drawings, an inkjet image forming apparatus according to one embodiment of the present disclosure will be described.

Figure 1:
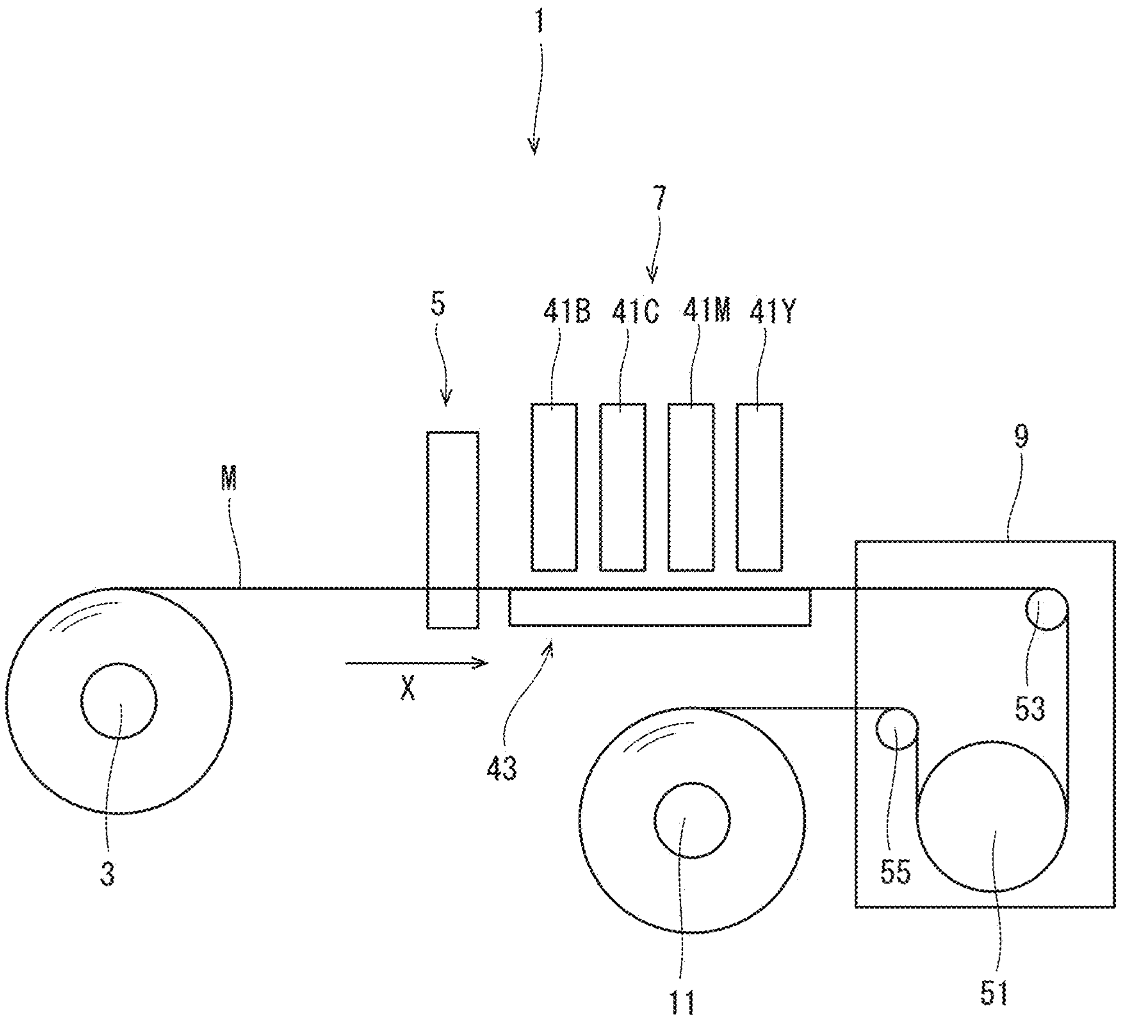
FIG. 1 is a front view schematically showing an inkjet image forming apparatus according to one embodiment of the present disclosure.

With reference to FIG. 1, the entire structure of the inkjet image forming apparatus 1 will be described. FIG. 1 is a front view schematically showing the internal structure of the inkjet image forming apparatus 1.

The inkjet image forming apparatus 1 includes a supply roller 3 around which a long printing base material M is wound, a corona treatment unit 5 which applies corona discharge to the printing base material M supplied from the supply roller 3, an image forming part 7 which forms an image on the printing base material M applied with the corona discharge, by an inkjet method, a drying part 9 which dries the image formed by the image forming part 7, and a winding roller 11 which winds the printing base material M dried by the drying part 9.

First, the supply roller 3 will be described. The printing base material M is wound and mounted on the supply roller 3. When the supply roller 3 rotates, the printing base material M is fed out in a predetermined conveyance direction X.

Figure 2:
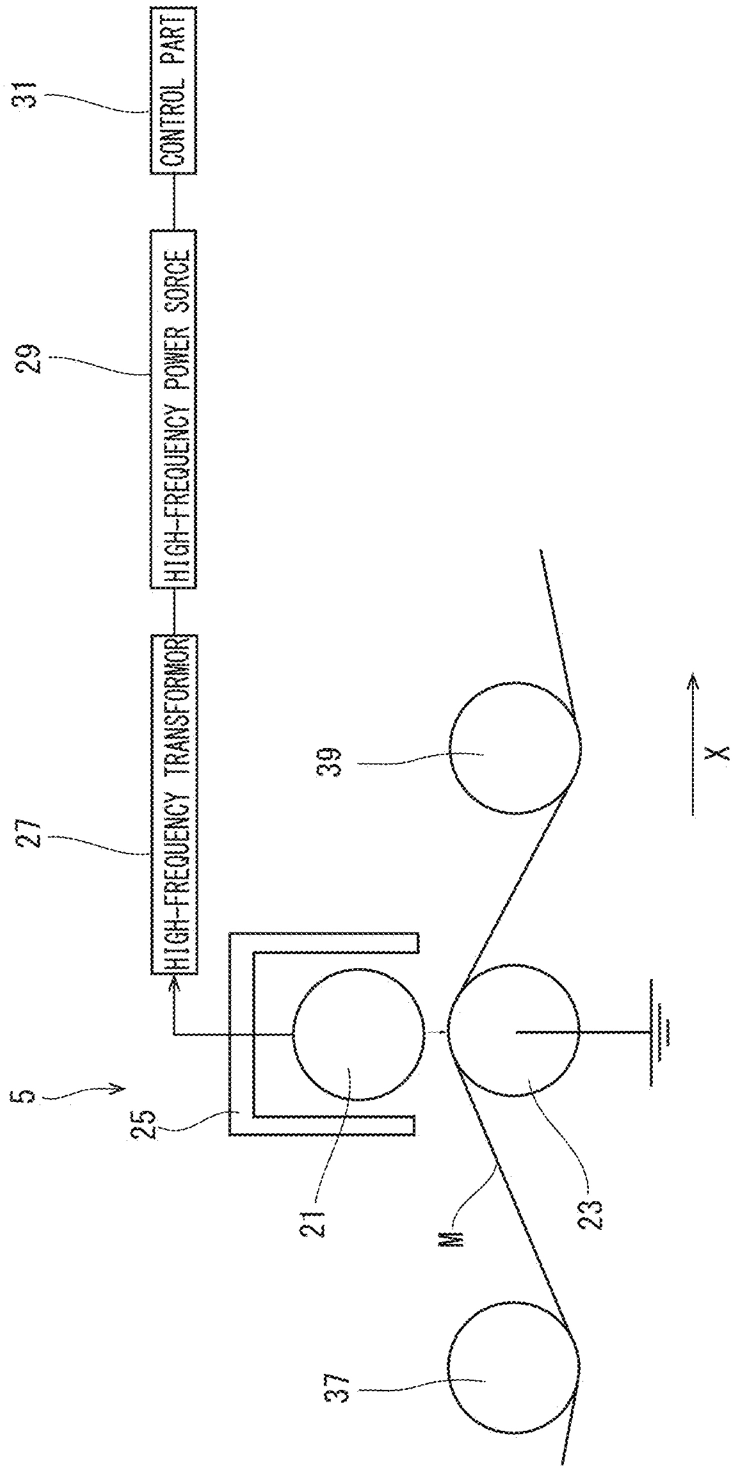
FIG. 2 is a view schematically showing a corona treatment unit in the inkjet image forming apparatus according to the embodiment of the present disclosure.
Figure 3:
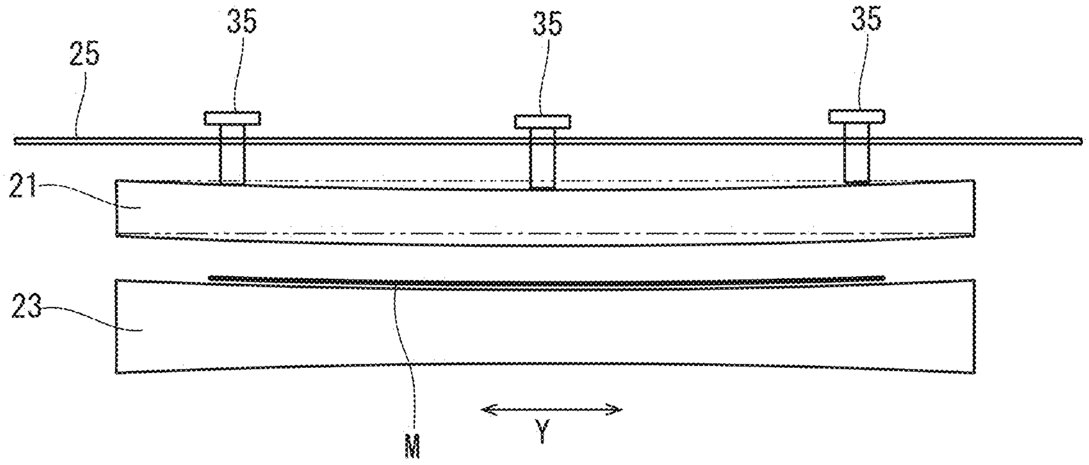
FIG. 3 is a front view schematically showing a corona discharge electrode and a counter roller, in the corona treatment unit in the inkjet image forming apparatus according to the embodiment of the present disclosure

Next, the corona treatment unit 5 will be described with reference to FIG. 2 and FIG. 3. FIG. 2 is a view schematically showing the corona treatment unit 5, and FIG. 3 is a front view showing a corona discharge electrode 21 and a counter roller 23. The corona treatment unit 5 is arranged on the downstream side of the supply roller 3 in the conveyance direction X. The corona treatment unit 5 is provided with a corona discharge electrode 21 and a counter roller 23 arranged at a predetermined interval from the corona discharge electrode 21.

The corona discharge electrode 21 is made of, for example, rod-shaped ceramic or aluminum cylinder coated with ceramic, elongated in the width direction Y of the printing base material M. The corona discharge electrode 21 is covered with an electrode cover 25 whose lower surface is opened. The corona discharge electrode 21 is connected to a high-frequency power source 29 through a high-voltage transformer 27. The high-frequency power source 29 generates a high-frequency AC current. The high-frequency AC current is, for example, 5.5 kV to 6.5 kV. The higher the discharge power, the higher the discharge voltage (discharge amount). However, since the discharge voltage varies depending on an atmospheric pressure, temperature and humidity, or the others, the discharge voltage is set depending on environmental conditions when the corona discharge treatment is actually performed. The high-voltage transformer 27 amplifies the generated high-frequency AC current, converts it into discharge power, and applies it to the corona discharge electrode 21. The high-frequency power source 29 is electrically connected to a control part 31, and generates a high-frequency AC current based on an instruction from the control part 31.

The counter roller 23 is made of, for example, stainless steel cylinder, and is grounded. The counter roller 23 has an inverted crown shape in which a diameter of the central portion is smaller than diameters of both end portions in the width direction Y of the printing base material M crossing the conveyance direction X. A difference between the diameter of the central portion and the diameter of both the end portions is 1 mm to 5 mm, in one example.

With reference to FIG. 3, the corona discharge electrode 21 and the counter roller 23 will be described. Both the ends of the corona discharge electrode 21 are fixed to the side plates of the electrode cover 25. Three adjustment screws 35 are screwed into the top plate of the electrode cover 25 at constant intervals in the width direction Y. The three adjustment screws 35 protrude downward from the top plate, and are in contact with the central portion and both the end portions of the corona discharge electrode 21. When the adjusting screws 35 are screwed in the top plate, the corona discharge electrode 21 is pressed downward by the adjustment screw 35 and deformed to bend downward.

The corona discharge electrode 21 is supported such that a distance from the counter roller 23 is constant in the width direction Y. More specifically, by setting a screwed-in amount of the adjustment screw 35 at the center portion to be larger than a screwed-in amount of the adjustment screws 35 at both the end portions, the corona discharge electrode 21 bends so that the center portion bends downward. As a result, a distance between the corona discharge electrode 21 and the counter roller 23 becomes constant in the width direction Y. The distance is, for example, 0.5 to 2.0 mm.

On the upstream side and the downstream side of the counter roller 23, an upstream side tension roller 37 and a downstream side tension roller 39 are arranged.

Next, the image forming part 7 will be described with reference to FIG. 1. The image forming part 7 is arranged on the downstream side of the corona treatment unit 5 in the conveyance direction X. The image forming part 7 is provided with four head units 41B, 41C, 41M, and 41Y corresponding to inks of four colors (black, cyan, magenta, and yellow) (collectively referred to as a head unit 41), and a conveying plate 43 on which the printing base material M is conveyed along the surface.

Figure 4:
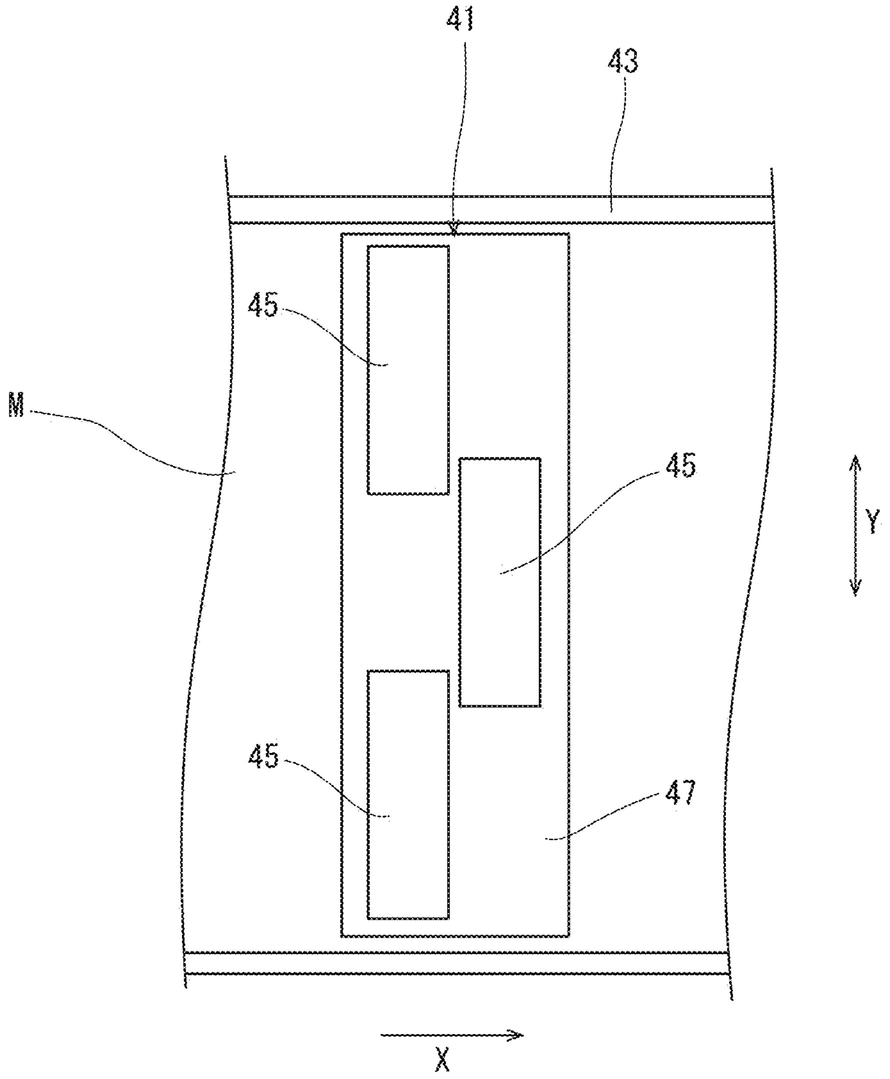
FIG. 4 is a plan view schematically showing a head unit in the inkjet image forming apparatus according to the embodiment of the present disclosure.

The head unit 41 will be described with reference to FIG. 4. FIG. 4 is a plan view showing the head unit 41. The head unit 41 includes three print heads 45 and a plate 47 for supporting the three print heads 45.

As shown in FIG. 4, the three print heads 45 are disposed in a staggered pattern along the width direction Y (a line head system) so as to have the same width as that of the printing base material M, and are supported by the plate 47. The print head 45 includes a number of nozzles (not shown). The ejection port of the nozzle is opened on the lower surface of the print head 45.

The four head units 41 are arranged in order along the conveyance direction X, and the black, cyan, magenta and yellow inks are supplied respectively. The supplied ink is ejected downward from the ejection port of the nozzle of each print head 45.

As shown in FIG. 1, the conveying plate 43 is disposed below the four head units 41. The upper surface of the conveying plate 43 is formed flat. As shown in FIG. 3, the width of the conveying plate 43 is wider than a width of the printing base material M and all the head units 41. A heat source (not shown) is provided below the conveying plate 43 to heat the conveying plate 43 to a predetermined temperature. The conveying plate 43 is made of metal, for example.

Next, the drying part 9 will be described. The drying part 9 is arranged on the downstream side of the image forming part 7 in the conveyance direction X. The drying part 9 includes a heat drum 51, and upstream side and downstream side tension rollers 53 and 55 arranged on the upstream side and the downstream side of the heat drum 51. The printing base material M passing through the image forming part 7 is wound around the heat drum 51 between the upstream side and downstream side tension rollers 53 and 55. The heat drum 51 is heated to dry the printing base material M conveyed along the surface.

Next, the winding roller 11 will be described. The winding roller 11 is arranged on the downstream side of the drying part 9 in the conveyance direction X. The end of the printing base material M is fixed to the winding roller 11. The winding roller 11 is connected to a motor (not shown) and rotated. By rotating the winding roller 11 in a predetermined direction at a predetermined rotational speed by the motor, the printing base material M is fed out from the supply roller 3.

The fed printing base material M passes between the corona discharge electrode 21 and the counter roller 23 of the corona treatment unit 5, and is conveyed to the image forming part 7. In the image forming part 7, the printing base material M is conveyed toward the drying part 9 along the upper surface of the conveying plate 43 under the four head units 41. Then, after being wound around the heat drum 51 in the drying part 9, it is wound up by the winding roller 11.

Next, the control part 31 will be described. As shown in FIG. 2, the control part 31 controls the high-frequency power source 29 of the corona treatment unit 5 to generate a high-frequency current of a predetermined intensity. The control part 31 is also electrically connected to the head units 41 and controls the head units 41 based on the input image data.

In the inkjet image forming apparatus 1 having the above configuration, the image forming operation for non-adsorbent printing base material will be described. In the image forming operation, the control part 31 controls the corona treatment unit 5 so as to perform the corona discharge treatment. Thus, corona discharge is generated between the corona discharge electrode 21 and the counter roller 23. In a case of adsorbent printing base material, the corona discharge treatment by the corona treatment unit 5 is not performed.

Thereafter, the motor is driven to rotate the winding roller 11, and the printing base material M is fed from the supply roller 3 to the corona treatment unit 5. In the corona treatment unit 5, the corona discharge is generated between the corona discharge electrode 21 and the counter roller 23, and the upper surface of the printing base material M is subjected to the corona discharge.

Thereafter, the printing base material M is conveyed below the head units 41, and the ink of a predetermined color is ejected from the corresponding head unit 41 based on the image data to form an image on the printing base material M. The printing base material M on which the image is formed is conveyed to the drying part 9. In the drying part 9, the ink is completely dried. Thereafter, the printing base material M is wound up by the winding roller 11.

Figure 5:
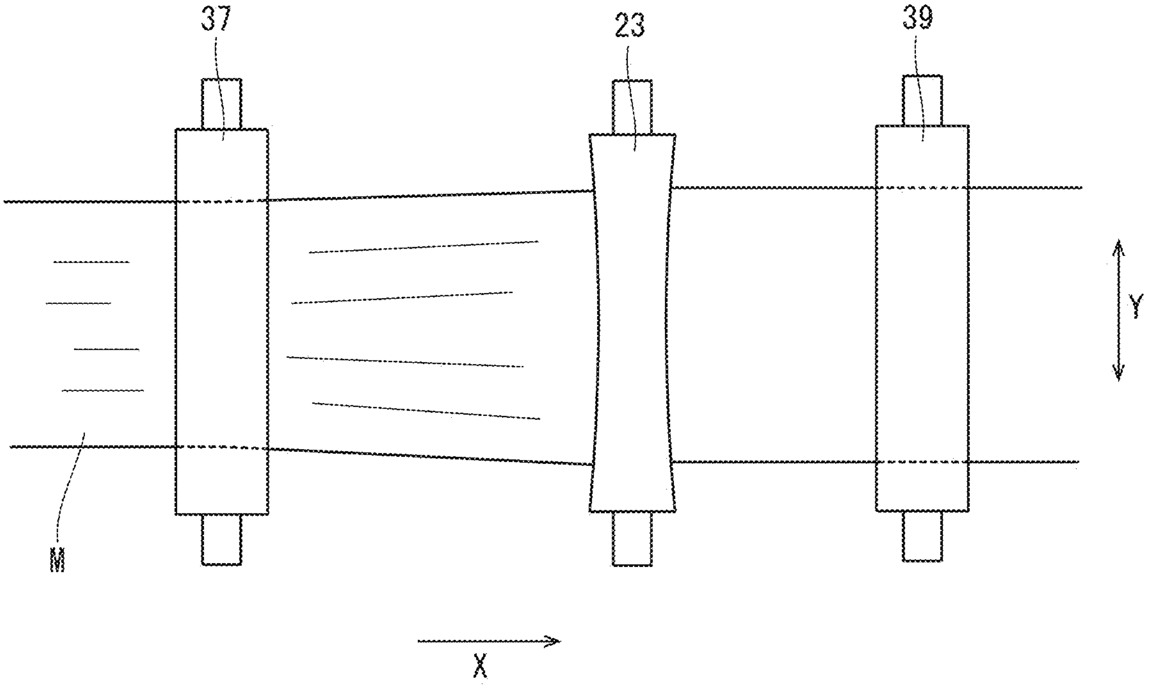
FIG. 5 is a view showing a printing base material passed on an upstream side tension roller, the counter roller, and a downstream side tension roller, when viewed from the upper side, in the inkjet image forming apparatus according to the embodiment of the present disclosure.

As described above, according to the present disclosure, by forming the counter roller 23 in an inverted crown shape, the non-absorbent printing base material M such as a plastic film can be conveyed without generating wrinkles. In other words, since the counter roller 23 has an inverted crown shape, a linear velocity of both the end portions is faster than that of the central portion. Then, as shown in FIG. 5, the printing base material M passed through the upstream side tension roller 37 is conveyed so as to be pulled toward both the end portions by the counter roller 23. As a result, the printing base material M is stretched in the width direction Y to eliminate wrinkles. Therefore, even if the thin and low stiffness printing base material M is conveyed at a high speed, the corona treatment can be uniformly applied in the width direction Y.

Next, a test for evaluating occurrence of wrinkles in the inkjet image forming apparatus 1 of this embodiment will be described with reference to the table of FIG. 6. In the present examples 1 to 3, an inverted crown shaped counter roller is prepared in which an outer diameter of the central portion is smaller than an outer diameter of both the end portions. A difference between the outer diameter of the central portion and the outer diameter of both the end portions is 5 mm in the present example 1, 2 mm in the present example 2, and 1 mm in the present example 3. On the other hand, in the comparative Example 1, a difference between an outer diameter of the central portion and an outer diameter of both the end portions is 0, and in the comparative example 2, an outer diameter of the central portion is 1 mm larger than an outer diameter of both the end portions.

The corona discharge electrode is adjusted with the adjustment screws shown in the figure so that a distance between the corona discharge electrode and the counter roller is 1.0 mm. A cyan solid image is printed at a conveying speed of the printing base material of 25 m/min and a corona discharge amount of 80 $W \cdot min/m^2$.

First, occurrence of wrinkles when the printing base material enters the counter roller is visually evaluated. Furthermore, a density of the solid image is measured to evaluate a density unevenness. For the density measurement, a spectroscopy colorimeter CM-25cG (manufactured by Konica Minolta) is used.

As shown in the table of FIG. 6, no wrinkles are observed in the present examples 1 to 3. The density unevenness is about 0.01, which could be almost unrecognizable by visual observation. On the other hand, wrinkles are observed in the comparative example 1, and the number of wrinkles is increased in the comparative example 2. In the comparative examples 1 and 2, the density unevenness is about 0.03, which could be recognized by visual observation. That is, if the printing base material has wrinkles, there are portions to which the corona treatment is strongly applied and portions to which the corona treatment is weakly applied, and in the portions to which the corona treatment is weakly applied, the effect of obtaining compatibility (adhesion) with the ink by the corona discharge treatment is not sufficiently exhibited, so that the ink is easy to be repelled and the density becomes thin. As a result, the density unevenness occurs.

In addition, from the result of the present examples 1 to 3, it is confirmed that a difference between a diameter of the central portion and a diameter of the end portions of the counter roller 23 is appropriate to be 1 mm to 5 mm.

In the embodiments described above, four color head units 41 are used, but the present disclosure is not limited to four colors, and may be more or less than four colors. The head unit 41 is not limited to a line head system. However, the line head system is preferable because the printing speed can be increased. Although a long plastic film (PET film) is used as the printing base material M, a cut film may be used.

In the embodiments described above, the corona discharge electrode 21 is deformed in order to make a distance between the corona discharge electrode and the counter roller 23 of the inverted crown shape constant, however, the portion of the corona discharge electrode 21 facing the counter roller 23 may be formed such that the central portion is more protruded than both the end portions in accordance with a shape of the counter roller 23.

Although the present disclosure has been described with respect to specific embodiments, the present disclosure is not limited to the above embodiments. The above embodiments can be modified by those skilled in the art without departing from the scope and spirit of the present disclosure.

The invention claimed is:

1. An inkjet image forming apparatus comprising:

a head unit which ejects ink on a printing base material conveyed in a predetermined conveyance direction; and a corona treatment unit disposed on an upstream side of the head unit in the conveyance direction and performing a corona discharge on the printing base material, wherein the corona treatment unit includes a counter roller facing a corona discharge electrode, and the counter roller has an inverted crown shape in which a diameter of a central portion is smaller than diameters of both end portions in a width direction crossing the conveyance direction.

2. The inkjet image forming apparatus according to claim 1, wherein the corona discharge electrode is supported such that an interval from the counter roller is constant in the width direction.

3. The inkjet image forming apparatus according to claim 2, comprising:

a plurality of adjustment screws which are disposed in the width direction and press the corona discharge electrode toward the counter roller, wherein a screwed amount of the adjustment screw is varied to deform the corona discharge electrode such that the interval between the corona discharge electrode and the counter roller is made constant in the width direction.

4. The inkjet image forming apparatus according to claim 1, wherein the printing base material is a plastic film.

* * * * *